Aug. 17, 1954 W. F. ALLER 2,686,424
PNEUMATIC GAUGING DEVICE
Filed Aug. 7, 1948 2 Sheets-Sheet 2
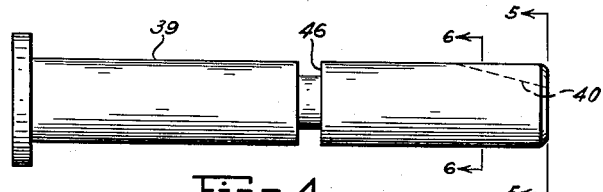
Fig-4
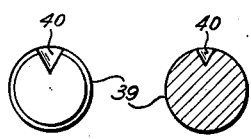
Fig-5 Fig-6
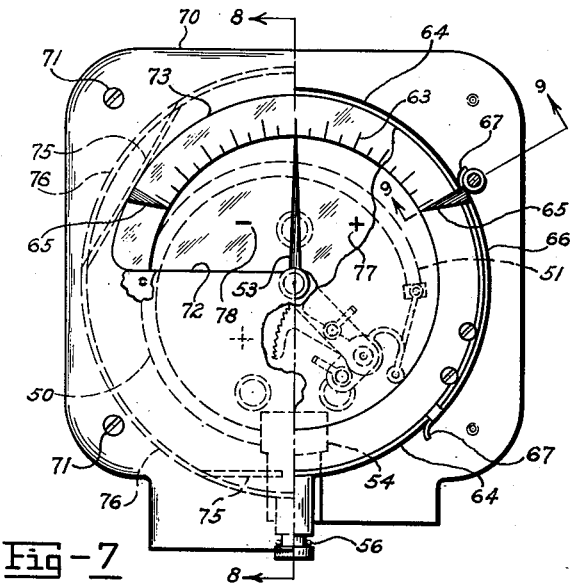
Fig-7
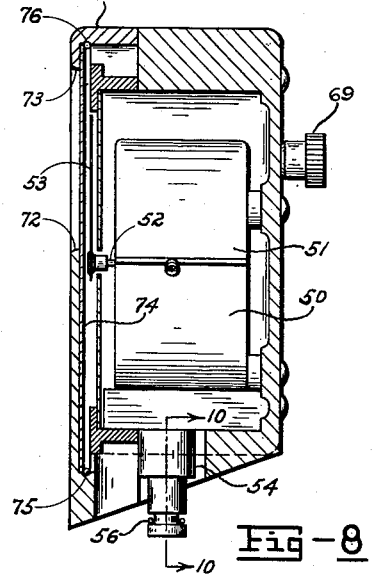
Fig-8
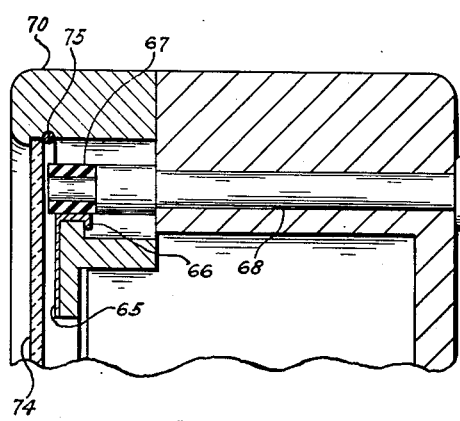
Fig-9
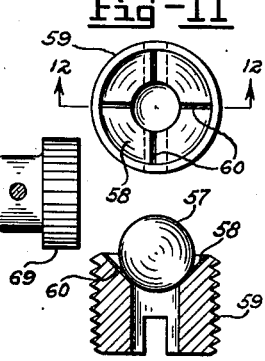
Fig-11
Fig-12
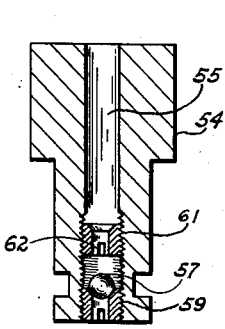
Fig-10
INVENTOR.
W. F. Aller
BY Edward T. Noe Jr.
atty.

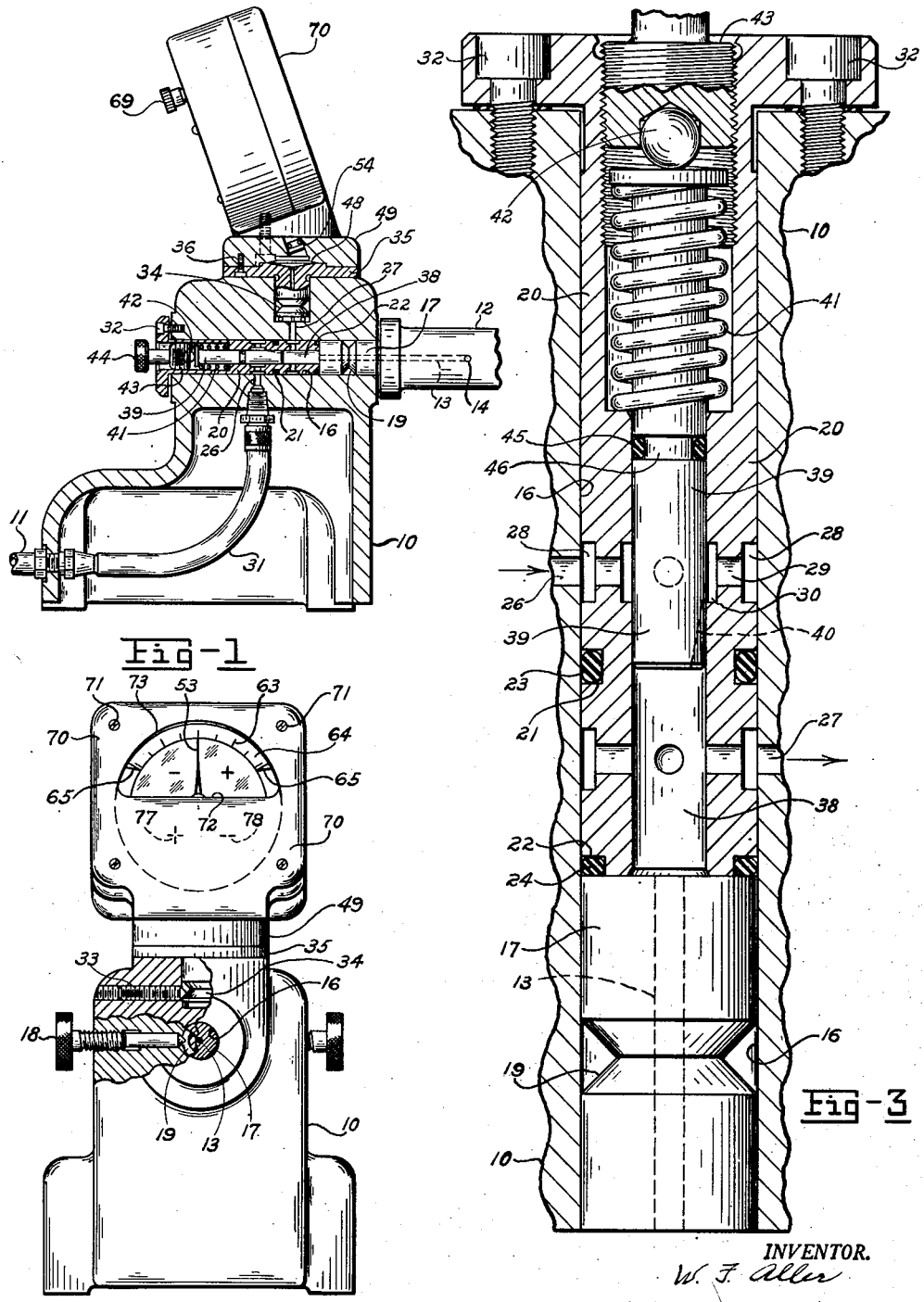

Patented Aug. 17, 1954

2,686,424

UNITED STATES PATENT OFFICE 2,686,424

PNEUMATIC GAUGING DEVICE

Willis Fay Aller, Dayton, Ohio, assignor to The Sheffield Corporation, Dayton, Ohio, a corporation of Ohio Application August 7, 1948, Serial No. 43,092

6 Claims. (Cl. 73—37.5)

This invention relates to precision gauging devices and more particularly to precision gauges for measuring or comparing the size or other characteristic of an object by measurement of fluid pressure resulting from fluid between the work and a gauge head or spindle provided with one or more gauging orifices through which leakage takes place in accordance with the distance between the surface of the gauging orifice and the work.

One object of the invention is the provision of a precision gauging instrument embodying a liquid-filled pressure indicator that is responsive to pressure changes and which is adapted for connection to a source of fluid pressure and to a gauging head having an orifice through which a leakage of fluid takes place, with means in the liquid flow path of the pressure gauge that provides for free movement of the liquid in one direction but restricts flow of the liquid in the other direction so as to very rapidly dampen mechanical oscillatory movements of the gauge indicator and thus increase the speed of a gauging operation.

Another object is the provision of a gauging instrument of the character mentioned in which a flexible pressure sensitive diaphragm is provided to enclose the liquid in the liquid-filled pressure gauge and in which means is provided in a restricted portion of the liquid path for instantaneously dampening return movement of the pressure indicator when a workpiece is applied to the gauge and a gauging indication obtained.

Another object is the provision of a gauging instrument adapted for connection to a source of gaseous fluid under pressure and to a gauging head having an orifice through which a leakage of the fluid takes place, and provided with an adjustable flow restrictor located between the supply and the pressure indicator and having a flow controlling orifice the cross sectional shape of which, in its various positions of adjustment, is an uninterrupted hole of approximately uniform width in all radial directions.

Another object is the provision of a gauging instrument embodying a base member having a passage extending therethrough, the passage being provided with a ported sleeve having an adjustable control valve movable axially of the sleeve to control the flow of fluid from the supply to the pressure indicator.

Another object is the provision of a gauging instrument including a pressure gauge and means for supporting a cover glass over the indicating mechanism so that the cover glass can be readily turned to present different portions in the field of view, such portions having plus and minus signs or indicia, thus adapting the instrument for the measurement of either internal or external dimensions according to requirements.

Other objects and advantages of the invention will be apparent from the following description, the appended claims, and the accompanying drawing, in which:

Fig. 1 is a side elevation of a gauge embodying the present invention, the base portion being shown in central vertical section;

Fig. 2 is a front elevation of the gauging instrument, with a portion of the base shown in section;

Fig. 3 is a sectional view on an enlarged scale through the passageway extending in the base member;

Fig. 4 is a detailed view, also on an enlarged scale, showing the adjustable restrictor valve in the air flow path;

Fig. 5 is an end view of the restrictor valve as indicated by line 5—5 of Fig. 4;

Fig. 6 is a section on the line 6—6 of Fig. 4;

Fig. 7 is a face view of the pressure gauge;

Fig. 8 is a vertical section on the line 8—8 of Fig. 7;

Fig. 9 is a section on the line 9—9 of Fig. 7;

Fig. 10 is an enlarged sectional view on the line 10—10 of Fig. 8;

Fig. 11 is an enlarged end view of the check valve and its seat; and

Fig. 12 is an enlarged sectional view showing the check valve and its seat as indicated by line 12—12 of Fig. 11.

Referring more particularly to the drawing in which like parts are designated by the same reference numerals in the several views, 10 designates the base member of a precision gauging instrument which is adapted for connection, by means of the conduit 11, to a source of fluid under pressure, preferably a constant pressure air supply. Connected to the base member, preferably by mounting directly thereon, is a gauging head 12 having a passage 13 in communication with diametrically opposed gauging nozzles 14, the outer surfaces of which are very slightly offset below the outer surface of the gauging head so that leakage of air can take place between these gauging nozzles and a workpiece applied to the gauging head, the amount of leakage flow taking place being dependent upon the amount of clearance between the nozzles and the workpiece. In this particular form of gauging head the device is adapted for gauging an internal dimension of a hole, although obviously the gauging head may be arranged for the measurement of an external dimension or characteristic of the workpiece.

The base member is provided with a passage 16 extending from one side to the other, and preferably made as a cylindrical hole extending clear through the base member so it can be very easily machined. A stem portion 17 of the gauging head fits into one end of this hole and is held in place by a hand screw 18 threaded in the base member and having a pointed end engaging the side 19 of a cam groove on the stem portion and holding this stem portion urged towards the left as viewed in Fig. 1 and thus securing it in fixed position but permitting its convenient removal when the hand screw 18 is withdrawn. Arranged in the passage 16 in line with the stem 17 is a hollow sleeve 20 (see Figs. 1 and 3) provided with grooves 21 and 22 that receive circular sealing rings 23 and 24 of yielding material. The ring 24 forms a pressure tight seal between the end of the sleeve and the end of the stem 17, while ring 23 forms a seal between an inlet port 26 and an outlet port 27. The inlet port is formed, in part, by an annular groove 28 in the sleeve, connected by radial holes 29 to another annular groove 30 in the sleeve. Attaching screws 32 in a flange head on the end of the hollow sleeve serve to secure the sleeve in position as shown in Figs. 1 and 3.

The port 26 is connected by the passageway 31 to a fluid pressure supply hose 11, and the outlet port 27 is connected to a liquid-filled pressure gauge which is held in place on the base member 10 by means of a holding screw 33 (see Fig. 2) engaging an annular groove 34 on the stem of a supporting bracket 35 to which the pressure gauge itself is connected by means of attaching screws 36. The outlet port 27 is in communication with the inlet port 26 through an adjustable restrictor valve 39.

The restrictor valve 39, as shown in Figs. 4, 5 and 6, comprises an axially adjustable plug provided with a tapered groove 40 the depth of which increases from a minimum at one end of the groove to a maximum at the end of the plug, the width of the groove also similarly increasing, the bottom of the groove being substantially V-shaped so that the cross sectional area of the groove where communication is established with the annular groove 30 of the inlet port 26 approximates a circle and is uninterrupted so that flow, even though restricted, can take place through the entire opening. By adjusting the plug lengthwise of the sleeve 20 the size of this opening can be increased or decreased according to the direction of movement, but in any position of adjustment turbulent action of the fluid flowing through the restriction orifice is avoided, as the orifice is an uninterrupted hole of approximate uniform width in all radial directions. By means of this adjustable restrictor there is a certain drop in pressure between the fluid in the supply pipe 11 and the fluid in the chamber 38 of the passage 13 leading to the gauging nozzles, depending upon the clearance between the work and the gauging nozzles of the gauging head. By adjusting the position of the plug 39 this pressure may be increased or decreased in the chamber 38 that leads to the pressure indicator. The pressure gauge can thus be accommodated to different requirements as determined by the size of the part, tolerance, etc., so that the pressure indicating pointer of the gauge will be in a desired position. Since the passages through which the gauging air or other fluid passes in its travel from the supply pipe 11 to the gauging nozzles are all small and substantially round, the flow will be smooth and with a minimum of turbulence and the size of this flow passage will not be large enough to interfere with the proper operation of the gauge.

The plug 39 is held yieldingly, by means of a spring 41, against a thrust ball 42 seated in an adjusting screw 43 which is threaded in the sleeve 20. The handle 44 is accessible on the side of the base member for the convenient adjustment of the screw 43 to thus adjust the position of the restrictor valve and control the size of the valve opening. A sealing ring 45 arranged in a groove 46 in the plug seals the passage between the plug and the sleeve.

The arrangement of the sleeve and plug, as previously described, affords a comparatively cheap construction in which the several parts can be accurately made and conveniently assembled, since intricate machining operations are not required.

The outlet port 27 places the chamber 38 in communication with the lower side of a pressure sensitive diaphragm 48, of rubber or other suitable material, clamped at its peripheral portions between the bracket 35 and the foot 49 of the pressure gauge. The space above the diaphragm 48 is completely filled with liquid, preferably kerosene, so that as a change in pressure occurs on the lower side of the diaphragm, resulting in diaphragm movement, that pressure is instantly transmitted through the liquid in the pressure gauge to the pressure responsive element of the gauge. As shown in Figs. 7 and 8, the pressure responsive element is a hollow curved tube 50 having a free or movable end 51 which is mechanically connected in any conventional manner to the stem 52 of an indicating pointer 53. The other end of the tube is secured to a supporting post 54 providing a liquid passage 55 and having a sealing ring 56 which prevents loss of liquid between the post and the passage in the foot 49 of the pressure gauge in which the post is inserted. It will be understood that as the curved flexible tube is subjected to pressure changes, the tube contracts or expands and operates the indicating pointer 53.

In a pressure gauge of the conventional Bourdon type tube, the pointer oscillates or swings back and forth a number of times before it reaches a stable position when subjected suddenly to increased pressure. In accordance with the present invention, when a workpiece is applied to the gauging head and a sudden increase in pressure takes place in the passage connected to the pressure gage, the indicating needle will move from a position of rest corresponding to a depressed position of the diaphragm, up to a gauging position such as that shown in Fig. 7, or very close to that position. Any return swing due to the inherent flexibility of the mechanical parts such as would tend to create vibratory oscillation of those parts is subjected to a dampening action as soon as a return movement of the pointer is initiated, the result being that the needle or indicator 53 comes up to the proper indication and remains there instead of coming up to an indication and then swinging back and forth several times until it finds a point of stability. This is accomplished by checking the return movement of liquid in the liquid passage at the instant such return movement starts, or substantially at that instant. The result is a considerably faster response. In other words, it takes considerably less time from the instant the work is applied until the instant that the pointer reaches a stable indicating position, thus saving the operator's time.

This fluid checking means in the liquid path, as shown, comprises a ball 57 resting on a conical surface 58 of a valve seat 59 which is threaded in the end of the post 54. The surface 58 has a few radial scratches or shallow grooves 60 so that some small flow of liquid can always take place in a downward direction even when the ball rests on the seat. The instant an up flow of liquid takes place through the valve seat 59, the ball moves away from the seat and offers no restriction. A retainer 61 threaded in the stem 54 a substantial distance above the ball prevents excessive ball travel but even if the ball should come up against this retainer free flow is not blocked off since the retainer has a wide, deep screwdriver slot 62 through which free flow can take place. The action of the ball 57 permits the indicating pointer 53 of the pressure gauge to instantly move to an indicating position when the workpiece is applied and the pressure to which the pressure gauge is subjected is instantly increased. However, the very instant an oscillatory rebound or swing in a reverse direction starts, the ball becomes immediately effective to prevent any large down flow of liquid, and the liquid being incompressible, the action is to instantaneously dampen oscillatory movements and hold the pointer in its true indicating position. A limited leakage of liquid past the ball in a downward direction permits the indicator to return promptly to a true indicating or stable position in case it should slightly overswing in its initial movement.

When the workpiece is removed from the gauging head and the pressure to which the diaphragm and the other parts of the pressure indicator is subjected is suddenly decreased, the indicating needle moves backwardly or counter-clockwise very much slower than it moves to indicating position, due to the restriction provided by the ball 57, preventing any undue strain on the mechanical portion of the gauge. This, however, is not undesirable because it is immaterial whether or not the indicating needle has reached a zero position, hidden from view below the lower part of the pressure gauge face plate, before the next part is applied to the gauge.

As a further means for obtaining very precise and accurate indications and for the convenience of the operator, the indicating pointer 53 is arranged in the same plane as the indicia or scale marking 63 on the scale ring 64. Arranged on this scale ring are adjustable pointers 65 which may be instantly set in a desired position to show the position of the permissible maximum tolerances in any particular gauging operation, one of these pointers being placed in proper position corresponding to the limit of tolerance on the plus side and the other on the minus side. Each of these pointers 65 is formed as a downturned extension on a curved metal strip 66 which rides on the periphery of the scale ring 64, holding ears 67 serving to retain the strip in position while permitting the strip to move in the direction of its length. This movement of the strip for the adjustment of the pointer 65 is accomplished through a friction wheel 67 on the end of a spindle 68 which can be turned by an adjusting knob 69 conveniently accessible at the rear of the pressure gauge. Such an adjusting knob is provided for each of the two pointers 65.

The main housing portion of the pressure gauge is covered by a cover plate 70 held in place by attaching screws 71. This plate has a semi-spherical opening defined by a horizontal wall 72 and a semi-circular wall 73. A circular cover glass 74 is frictionally held in place by a spring ring 75 portions of which are seated in a groove 76 in the cover plate. This spring permits the operator to turn the glass in order to bring different quadrants of the glass into view and each one of these quadrants is provided with an indicia such as a plus or minus sign 77, 78, arranged in alternating quadrants. With the glass positioned as shown in Fig. 7, if the indicating pointer is to the right of its normal zero position it shows that the dimension of the part gauged is plus, this arrangement being for use with a gauging head that measures an internal dimension. If the size of the hole gauged is smaller than it normally should be, this would be indicated by the minus sign on the quadrant through which the pointer is visible. To accommodate the pressure gauge to measure an external dimension, the glass is merely turned 90 degrees thus bringing a minus sign on the right side and a plus sign on the left side of the visible portion of the glass.

It will be apparent from the foregoing that the invention provides a gauge for precise measurements, capable of operation with a rapidity that has not heretofore been obtained, and one that is very conveniently adjusted to accommodate varying gauging conditions. While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device of the character described comprising a base having a supply pasageway adapted for connection to a source of fluid pressure, a curved pressure responsive hollow tube having a movable end, an indicator mechanism connected to the movable end of said tube, a flexible pressure sensitive diaphragm between the tube and the supply passageway, a quantity of liquid filling the tube and contacting the diaphragm and a check valve for said liquid arranged between the diaphragm and the tube, said valve comprising an element movable in accordance with the direction of flow of fluid through the valve, means in said valve cooperating with said element to allow free liquid movement past said element in one direction and means in said valve cooperating with said element to restrict liquid movement in the other direction to a very limited rate.

2. A gauging device comprising a support having a chamber adapted for connection to a source of fluid pressure and to a gauging head having an orifice through which a leakage of the fluid takes place, a pressure responsive hollow tube having a movable end, an indicator mechanism connected to the movable end of said tube, a flow restrictor located ahead of said chamber, a flexible pressure sensitive diaphragm between the tube and said chamber, a quantity of liquid filling the tube and extending to the diaphragm and a check valve for said liquid arranged between the diaphragm and the tube, said valve comprising an element movable in accordance with the direction of fluid flow through the valve, means in said valve cooperating with said element to allow free liquid movement past said element towards the tube and means in said valve cooperating with said element to restrict liquid movement in the other direction to a very limited rate.

3. A gauging device of the character described adapted for connection to a source of fluid pressure and to a gauging head having an orifice through which a leakage of the fluid takes place, comprising a liquid filled pressure gauge adapted to be subjected to rapid pressure changes and a check valve unit in the liquid flow path, said unit comprising an element movable in accordance with the direction of flow of fluid through the valve unit, means in said unit cooperating with said element to allow free liquid movement past said element in one direction and means in said unit cooperating with said element to retrict movement of the liquid in the other direction to instantaneously dampen mechanical oscillatory movements of the pressure gauge.

4. A gauging instrument of the character described adapted for connection to a source of fluid pressure and to a gauging head having an orifice through which a leakage of the fluid takes place, comprising a base member having a straight passage extending from one side of the base to the other, a supply passageway and a pressure indicator communicating with said passage at locations axially displaced along the passage, a hollow sleeve in said passage and axially removable therefrom, said sleeve having ports at said displaced locations, a control valve adjustable axially of said sleeve to control the flow of fluid from the supply passageway to the pressure indicator through said ports, said valve having a cylindrical portion fitting the inside of the sleeve and provided with a tapered axially extending flow regulating section, means accessible at an end of said sleeve to adjust said valve axially of the sleeve, means providing communication between the inside of the sleeve on the downstream side of said valve and the gauging head, and means including a one-way check valve providing communication between the inside of the sleeve on the down stream side of said valve and the pressure indicator.

5. A size gauging device of the character described comprising a support having a chamber adapted for connection to a source of air pressure and to a gauging head having an orifice through which a leakage of air takes place, a pressure responsive member having a movable portion operable in accordance with pressure changes, indicator mechanism connected to the movable portion of the pressure responsive member, means for restricting the flow of air through said chamber, a flexible pressure sensitive diaphragm between said chamber and said member, a quantity of liquid filling the member and extending to said diaphragm and sealed by said diaphragm, and a one-way check valve for said liquid arranged between the diaphragm and the member, said valve comprising an element moveable in accordance with the direction of flow of fluid through the valve, means in said valve cooperating with said element to allow free liquid movement past said element towards said member and means in said valve cooperating with said element to restrict movement of liquid in the other direction to a very limited rate so that the indicator mechanism is instantly operated as an increase in pressure obtains in the chamber and a gradual return of the indicator mechanism takes place when the pressure in the chamber decreases.

6. A liquid filled pressure gauge of the character described adapted to be subjected to rapid pressure changes over a wide range, comprising a pressure responsive chamber, a quantity of liquid filling the chamber, an indicating means connected to said pressure responsive chamber adapted for connection to a source of air pressure, partitioning diaphragm between the air and liquid, a one-way check valve unit in the liquid, said unit comprising an element movable in accordance with the direction of flow of fluid through the valve unit, means in said unit cooperating with said element to allow free liquid movement past said element towards said pressure responsive chamber and means in said unit cooperating with said element to restrict liquid movement in the other direction, to instantaneously dampen mechanical oscillatory movements of the pressure gauge.

References Cited in the file of this patent

UNITED STATES PATENTS

| Number | Name | Date |
|---|---|---|
| 643,876 | Lane | Feb. 20, 1900 |
| 1,121,105 | Karlson | Dec. 15, 1914 |
| 1,497,372 | Green | June 10, 1924 |
| 1,619,937 | Huff | Mar. 8, 1927 |
| 1,888,298 | Teesdale | Nov. 22, 1932 |
| 1,898,257 | Nelson | Feb. 21, 1933 |
| 1,927,437 | Chisholm | Sept. 19, 1933 |
| 1,939,509 | McClelland | Dec. 12, 1933 |
| 1,990,576 | Vincent | Feb. 12, 1935 |
| 2,003,949 | Morgan et al. | June 4, 1935 |
| 2,191,140 | Ford | Feb. 20, 1940 |
| 2,212,466 | Bradford | Aug. 20, 1940 |
| 2,360,705 | Moore | Oct. 17, 1944 |
| 2,372,408 | Trich | Mar. 27, 1945 |
| 2,410,671 | Moore | Nov. 5, 1946 |
| 2,457,401 | Rupley | Dec. 28, 1948 |